United States Patent [19]
Potts et al.

[11] Patent Number: 5,296,659
[45] Date of Patent: Mar. 22, 1994

[54] DIFFERENTIAL PRESSURE MONITORING DEVICE

[75] Inventors: Luken W. Potts, Merion; Alfred R. Schenker, Norristown, both of Pa.; Michael D. Ross, Somerdale, N.J.

[73] Assignee: Viz Manufacturing Company, Inc., Philadelphia, Pa.

[21] Appl. No.: 5,584

[22] Filed: Jan. 19, 1993

[51] Int. Cl.$^5$ .............................................. H01H 35/34
[52] U.S. Cl. ...................... 200/83 J; 73/861.47; 200/61.58 R; 280/736
[58] Field of Search ............... 338/172, 179, 198, 200; 280/736, 737, 741; 180/268, 282; 73/269, 271, 861.47; 200/61.08, 61.54, 61.58 R, 82 R, 83 R, 83 A, 83 J, 83 P

[56] References Cited

U.S. PATENT DOCUMENTS

| | | |
|---|---|---|
| 3,815,935 | 6/1974 | Jones .................. 200/61.58 R |
| 3,832,507 | 8/1974 | Marquardt et al. ........... 200/61.45 R |
| 4,049,935 | 9/1977 | Gruber ................... 200/83 P |
| 5,071,160 | 12/1991 | White et al. ............. 280/735 |
| 5,226,667 | 7/1993 | Coultas ................... 280/734 |

FOREIGN PATENT DOCUMENTS 361852 6/1962 Switzerland .................. 200/83 J Primary Examiner—Gerald P. Tolin
Attorney, Agent, or Firm—John B. Sowell

[57] ABSTRACT

A novel hybrid air bag inflator system includes a differential pressure monitoring switch which comprises a sealed module containing a gas under a threshold pressure mounted in a gas bag filler tank. The capsule comprises a movable diaphragm connected to a fixed top plate and the diaphragm is supported on a shaped mandrel mounted on a switch body. The switch body and the mandrel are provided with a central aperture through which moves a movable piston and the movable piston forms a support for switch contacts which are normally open until the pressure in the hybrid air bag gas filler tank falls below a predetermined operable reference pressure at which time the switch contacts reach a closed position indicative of a failed or inoperative hybrid system.

16 Claims, 5 Drawing Sheets

DIFFERENTIAL PRESSURE MONITORING DEVICE

BACKGROUND OF THE INVENTION

1. Field of the Invention

The present invention relates to monitoring devices for air bags or air cushioning apparatus for the protection of vehicle passengers. More particularly, the present invention relates to a differential pressure monitoring device for sensing a predetermined range of operable conditions and a hybrid inflator for a vehicle air bag system.

2. Description of the Prior Art

It was estimated in October 1992 that 7 million air bags had been installed in automotive vehicles in the United States alone. The Surface Transportation Efficiency Act specifies that driver and passenger side air bags must be fitted to all new automobiles by the 1998 model year and to all light trucks by the 1999 model year. While air bags are estimated to reduce fatal accidents by less than 5% when used in conjunction with 3 point safety belts, they are known to reduce moderate-to-severe injuries by 20-29%, thus, justifying their requirement in vehicles.

Presently there are two basic types of air bag inflating systems. First, there is a self-contained pyrotechnic-type inflator which comprises a sensor, a pyrotechnic igniter/inflator and a folded air bag in a pocket or carrier. The mode of operation of such devices is to sense a predetermined structural deformation which causes an impact force within one and one-half milliseconds of the time of the impact force. Immediately following the sensing of deformation, and before 30-35 milliseconds have passed, when the passenger/occupants would begin moving forward inside of the vehicle, the air bag should become sufficiently inflated to arrest the forward motion of the passenger and retain them in the portion of the vehicle least subject to deformation The disadvantage of the pyrotechnic-type inflator is its high cost and extremely high heat generated inside of the air bag by the pyrotechnic igniter which may cause burn injuries to the exposed parts of the body touched by the hot air bag.

A second type of air bag employs a lower cost hybrid type inflater which comprises a sensor, an igniter/gas generator, a large volume pressure tank loaded with a predetermined inert gas under very high pressure and a folded air bag. The gas in the pressurized tank is heated and expanded from room temperature by the igniter/gas generator before being used to inflate the air bag which is located remote from the pressure tank. The large volume of inert gas when heated is sufficient to completely inflate the air bag as fast as a pyrotechnic-type but at much lower temperatures during the expansion of the gas in the gas tank. The disadvantage of the hybrid-type inflater has been that a large pressure tank is required and a device for monitoring the inert gas pressure in the tank is required to assure that a minimum volume of inert gas is available for heating and inflating the air bag. The advantage to the hybrid-type inflater is its lower cost and the fact that it generates less heat in the air bag.

U.S. Pat. No. 4,049,935 shows and describes a complex pressure monitoring switch for use with a tank of a pressure chamber of the type employed with a hybrid-type inflater. The snap action switch of this prior art device comprises a diaphragm which is captured between two apertured reinforcement members which limit the excursion of the diaphragm when it snaps from one position to the other. The diaphragm forms one end closure of a cylindrical vessel which is filled to a predetermined fixed pressure level during manufacture.

It would be desirable to provide an improved monitoring device for a hybrid-type air bag inflater for filling an air bag with a large amount of moderately heated gas that is more sensitive to pressure changes in the pressure chamber and may be set to a desired threshold level rather than to a fixed pressure level during manufacture.

SUMMARY OF THE INVENTION

It is a principal object of the present invention to provide a monitoring device for placement inside of a gas pressurized tank used to fill an air bag of a hybrid-type air bag inflater system.

It is another principal object of the present invention to provide a novel pressure monitoring device having a small volume module or capsule for actuating an electrical switch.

It is another primary object of the present invention to provide a novel inexpensive differential pressure monitoring device.

It is another primary object of the present invention to provide a novel differential pressure monitoring device having a fail safe monitoring feature.

It is another primary object of the present invention to provide a novel differential pressure switch which has a linear displacement diaphragm which permits critical setting of individual switches at desired threshold pressures.

It is another primary object of the present invention to provide a novel method of manufacture and setting of a differential pressure switch for a hybrid-type air bag inflater.

It is another primary object of the present invention to provide a self-contained fail safe pressure monitoring device and method of manufacture.

It is another primary object of the present invention to provide a novel electrical switch having a leaf spring mounted on or actuated by a movable piston which spring biases the piston and also serves as an electrical contact.

According to these and other objects of the present invention, there is provided a novel hybrid-type air bag inflater system having a differential pressure monitoring device located inside a gas tank. Said pressure monitoring device comprises a sealed capsule containing a gas under threshold or reference pressure. The sealed capsule further comprises a movable diaphragm connected to a fixed top plate wherein the flexible diaphragm is supported on a shaped mandrel which is mounted on a switch body. The switch body and the mandrel are provided with a central aperture into which a movable piston is slidably guided. The movable piston forms a support for a novel switch contact spring which remains normally closed as long as the pressure in the gas tank of the hybrid type system remains at or above a predetermined operable pressure condition. The novel switch contacts are open when the pressure in the gas tank of the hybrid-type system falls below a predetermined operable pressure indicative of a failed or inoperable condition.

DETAILED DESCRIPTION OF THE PREFERRED EMBODIMENTS

Figure 1:
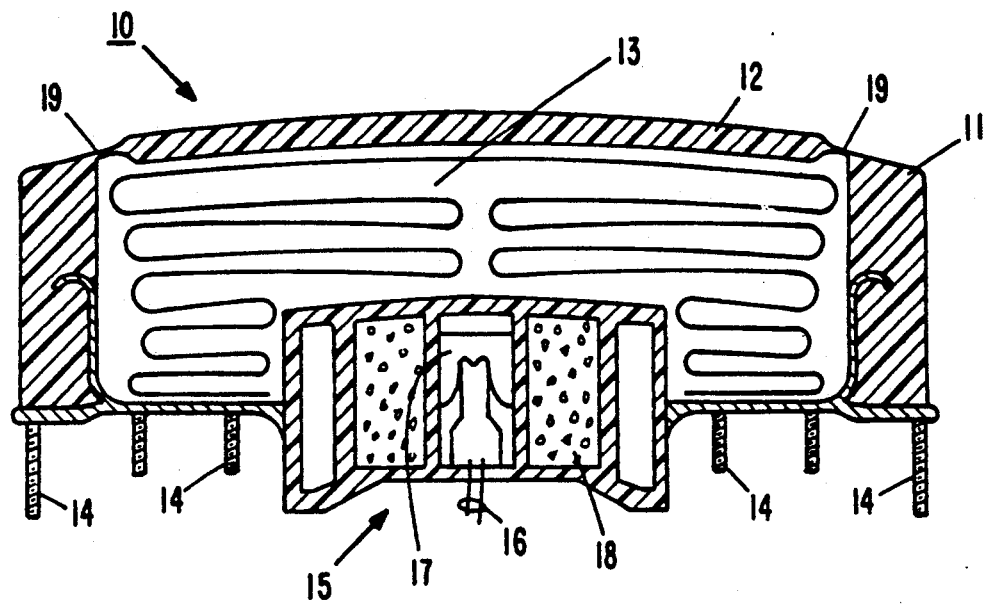
FIG. 1 is a schematic drawing in section showing a prior art pyrotechnic-type air bag inflater.

Refer now to FIG. 1 showing a schematic drawing in section of a prior art pyrotechnic-type air bag inflator 10. Inflator 10 comprises a body 11 for housing an air bag and is provided with a breakaway cover 12. The folded air bag 13 and housing 11 comprise a modular unit which is bolted onto a steering wheel or other part of a vehicle by means of bolts 14. Located centrally and below the folded air bag 13 is an igniter unit 15. The igniter unit 15 is connected by wires or leads 16 to a remote sensor (not shown) which may sense the deformation of a part of the vehicle or may sense a predetermined deceleration effect. The signal from the remote sensor first ignites the igniter charge 17 which in turn ignites the pellets of sodium azide 18 which generates a hot nitrogen gas which is filled with undesirable contaminants.

When the igniter 17 explodes, a large volume of hot gas enters the inner chamber of the folded air bag 13 and generates sufficient force for the cover 12 to be blown open at the breakaway edges 19. A known disadvantage of the prior art pyrotechnic type air bag inflator system is that the hot gases inside of the air bag bleed through either the material of the air bag or special vents provided therefor during the deflation mode of the air bag. In either event, the hot gases in the air bag are sufficient to create a situation where the hot air bag when engaging bare skin can cause burns. Further, when the prior art pyrotechnic type air bag inflator is placed on the passenger size, a large additional volume of hot gas is required to fill the space between the passenger and the housing mounted on the front dash of the vehicle The requirement for a larger amount of hot gas further heats the air bag and generates a more dangerous condition than that which existed on the driver's side.

Figure 2:
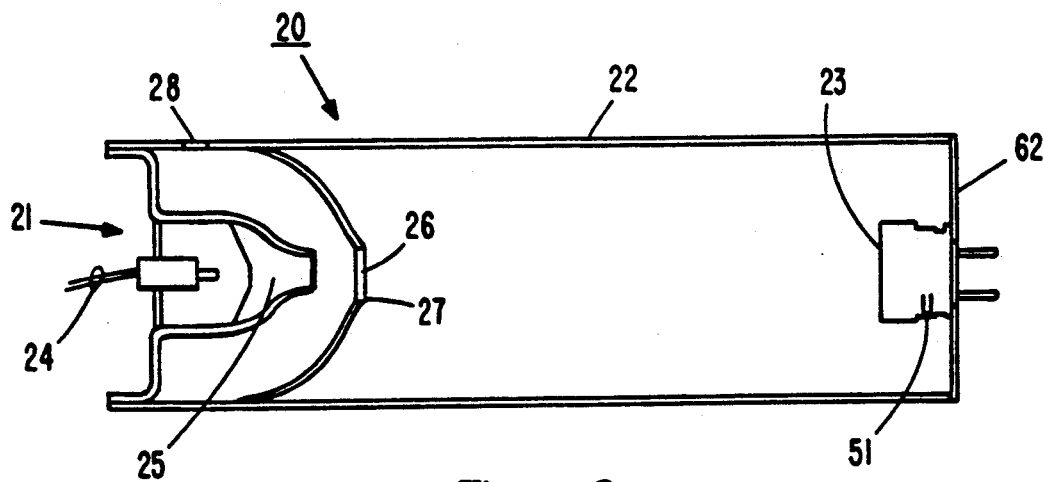
FIG. 2 is a schematic drawing in section showing a low cost hybrid-type air bag inflator which employs a combination of a pyrotechnic igniter and an inert gas stored under pressure in a pressure tank which is provided with a system readiness monitor.

Refer now to FIG. 2 showing a schematic drawing in section of a low cost hybrid-type air bag inflator 20 which comprises a small pyrotechnic igniter 21 and an inert gas stored in a tank 22 which is provided with a system readiness monitor 23. In the preferred mode of operation, a remote sensor (not shown) is coupled by electrical wires 24 to the igniter system 21 and when an accident condition is sensed, the igniter activates a pyrotechnic heater generator 25 which ruptures a burst disk 26 separating the igniter from the gas in tank 22. The inert type gas in the tank 22 starts to escape through the aperture 27 and the exit aperture 28 before the gas generator 25 has completely heated the gas inside the tank 22. Thus, it will be understood that once the burst disk 26 is removed, the velocity of the gas from the gas generator 25 is initially sufficient to charge into the tank 22 and heat the gas before the gas has a chance to escape, thus the mode of operation of the escaping gas is similar to a counterflow heat exchanger. The hybrid-type inflator has the advantage that a small amount of pressurized gas may be placed inside of tank 22 and when heated generates a sufficient large supply of moderately heated gas that is capable of inflating a folded air cushion 13 located on the passenger side of a vehicle. Further, the system shown in FIG. 2 may also incorporate a sensor to provide an integral unit which is located remote from the location of the air bag that may be located behind a decorative panel on the passenger's side of the vehicle. Further, since the inflator portion of the hybrid-type air bag device may be located remote from the air bag, it is now possible to place air bags in a position opposite the passengers in the rear seat of a vehicle to ensure that they too are protected from injuries which occur during severe accidents.

Figure 3:
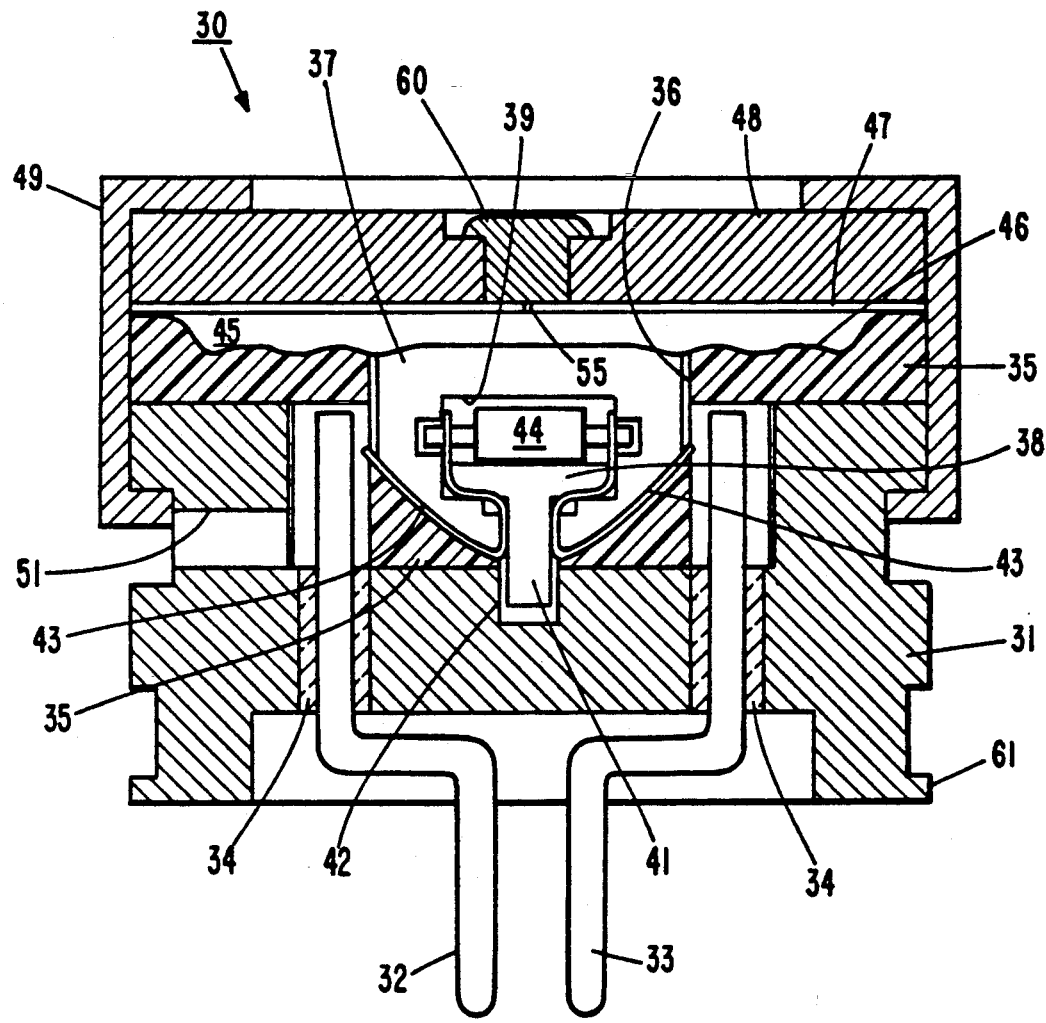
FIG. 3 is a schematic drawing in section of the preferred embodiment system readiness monitor shown in FIG. 2 and further showing a novel differential pressure switch in an open circuit condition.

Refer now to FIG. 3 showing a schematic drawing of the preferred embodiment system readiness monitor 23 shown in FIG. 2. The preferred embodiment readiness monitor 23 comprises a switch body 31 through which electrical leads 32 and 33 pass from outside to a position inside of the body and are sealed with insulating glass to metal seals 34. Physically located on top of switch body 31 is a mandrel 35 which is provided with a central recess 36 into which a piston body 37 is slidably guided. The piston body 37 is shown having a separate plug element 38 which fits inside of a slot or recess 39 the piston body 37. The plug element 38 preferably is provided with an extension or guide pin 41 which extends into a guide recess 42 in the switch body 31. A pair of symmetrical leaf springs 43 are formed to fit between the piston body 37 and the plug element 38. The plug element (or the body 37) is preferably provided with slots to hold and stabilize the leaf spring. When the plug element 38 slides into the recess 39, the leaf springs 43 are held in place. A fault isolation resistor 44 is shown connected between the two leaf springs 43 and permit sensing of the difference between a short and a continuous electrical path at the leads 32 and 33. A novel capsule or module 45 comprises a flexible diaphragm or bottom plate 46 and a rigid or fixed top plate 47 which is held in place by a rigid cover or cap 48 which is coupled or held to the switch body 31 by a retainer 49. In the preferred embodiment shown in FIG. 3, the readiness monitor 23 operates as a differential pressure monitoring switch where the outside pressure to be monitored has access to the bottom of flexible diaphragm 46 via an access hole 51. When the switch 23 is first mounted inside of the tank 22 shown in FIG. 2, the pressure inside of module or capsule 45 is greater than the pressure inside of the tank 22 and the switch contacts 43 are normally open as shown in FIG. 3.

The pressurized gas inside of module 45 must be inserted as a gas after the switch 23 is assembled with the retainer 49 attached. For the purpose of filling the module 45 with a high pressure gas approaching 3,000 pounds per square inch, an access plug 60 is provided. The details for filling the capsule 45 via small hole 55 will be explained in greater detail hereinafter.

Figure 4:
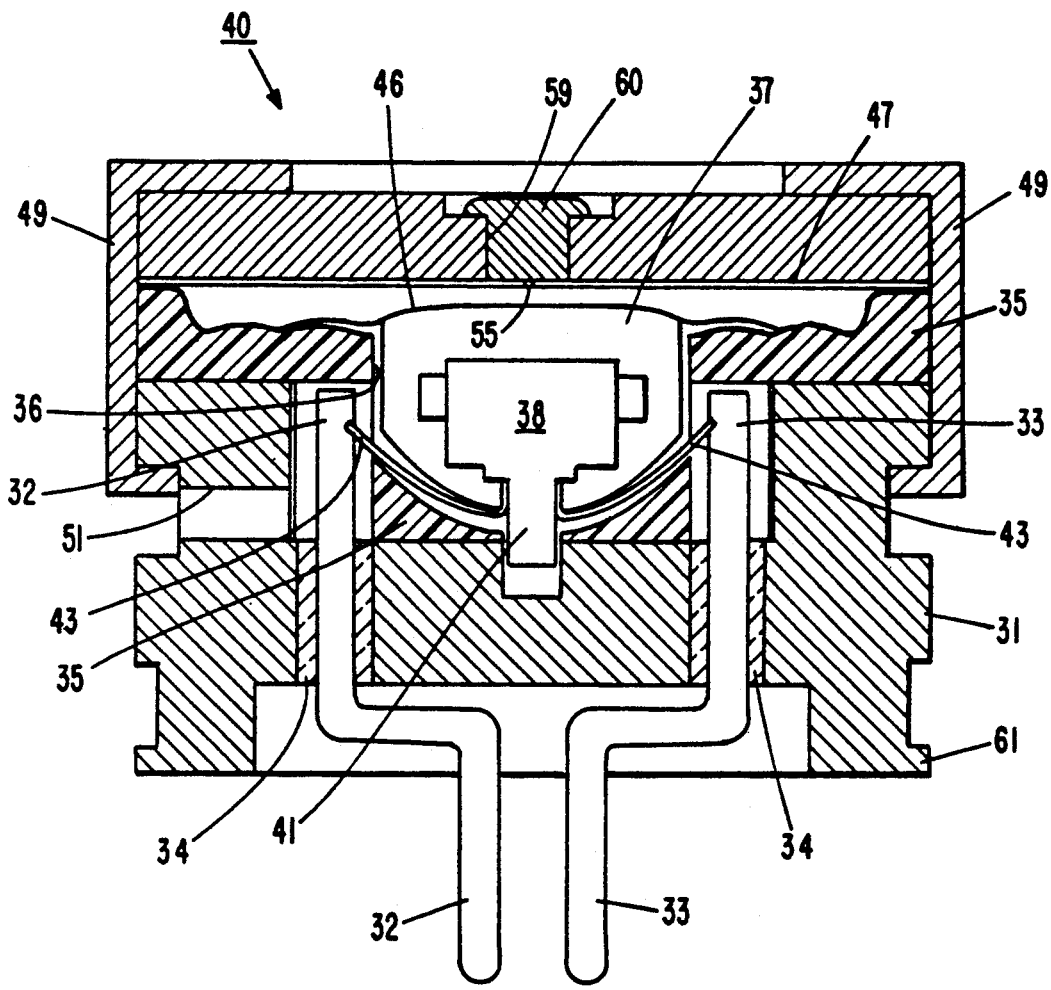
FIG. 4 is a schematic drawing in section of the monitor shown in FIG. 3 with the differential pressure switch in a normally closed circuit condition.

Refer now to FIG. 4 showing a schematic drawing in section of the preferred embodiment monitor 23A after the differential pressure in the tank 22 has been raised to a pressure exceeding the pressure in the capsule 45 permitting the piston body 37 to be raised in the recess 36 in the mandrel 35 which extends the leaf spring 43 horizontally outward to engage the upper portions of the leads 32 and 33 and to create a continuous electrical path therebetween. It will be noted in the preferred embodiment switch shown in FIGS. 3 and 4 that the leaf springs 43 serve two functions. The leaf springs 43 form the continuous path between the leads 32 and 33 and further provide a spring bias which urges the piston 37 against the bottom plate 46 of the capsule 45. Thus, it will be understood that a simple coil spring could be substituted for the novel leaf spring 43 to provide an upward bias on the piston 37. Further, a single leaf spring 43 could be employed in conjunction with a flexible electrical wired connection between a lead 32 and 33 and one leaf spring 43. It has been found more desirable to provide two insulated leads 32 and 33 rather than use the switch body 31 as an electrical path. In the FIG. 4 embodiment, the elements explained with reference to FIG. 3 that are identical to the elements shown in FIG. 4 and have been numbered the same and do not require further explanation.

The capsule 45 shown in FIG. 4 has the flexible bottom plate 46 urged upward allowing the spring contacts 43 to form a completed circuit between the electrical leads 32 and 33. The resistance measured at leads 32, 33 will permit confirmation of the spring contacts 43 being closed.

In a fail safe mode, a leak in capsule 45 allows the diaphragm 46 to move downward which opens the closed contacts 43. The same result occurs when the tank 22 loses critical operating pressure In either event the tank 22 with its system monitor 23 inside can be speedily replaced more economically than replacing a complete air bag inflation system. Leads 32, 33 are preferably connected to a light indicating instrument which lights up to indicate that a fail safe event has occurred.

Figure 5:
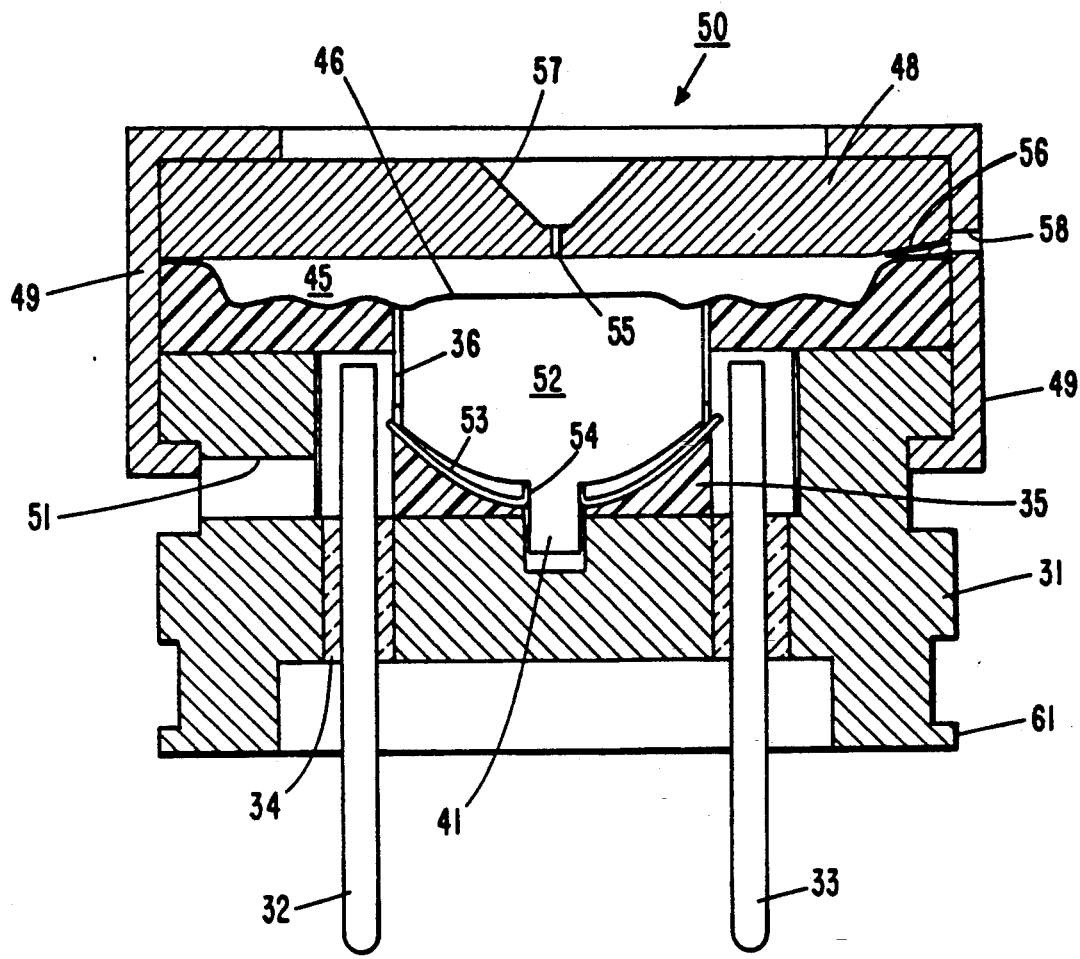
FIG. 5 is a schematic drawing in section of a modified differential pressure monitoring switch having the same mode of operation as the switch shown in FIGS. 3 and 4.

Refer now to FIG. 5 showing a schematic drawing in section of a modified differential pressure monitoring switch 50. In this embodiment, the top plate 47 of the module 45 has been removed and its function is provided by the cover plate 48. Instead of connecting the bottom plate 46 of the module 45 to the top plate 47, the flexible diaphragm 46 is now connected to the top plate 48. In this modified embodiment the fault isolation resistor 44 may be removed for purposes of economy. In this event, the piston body 37 and the piston plug 38 may be combined as an integral unit to provide further economies of manufacture. Further, the two leaf springs 43 shown mounted on the piston plug 38 may be replaced with a single spring 53 which is provided with a raised annular collar 54 which provides centering and stability when mounted on the guide pin 41. It has been found through experimentation that a continuous leaf spring with no annular collar may be placed in guide slots and the mandrel 35 and the guide pin 41 may be eliminated and still provide a perfectly operable structure.

As mentioned hereinbefore, it is necessary to fill the capsule or module 45 with a gas which is preferably inert to a pressure approaching 3,000 pounds per square inch. In the preferred embodiment method of filling the capsule 45 to the desired threshold pressure, there is provided a capillary size hole 55, 55' or 56 in the top plate 47 or 48. After filling the capsule 45 to the desired pressure, the capillary 55' or 56 may then be closed by heating the capillary size hole with a laser through the access holes 57 or 58 respectively.

It will now be appreciated that the access plug 60 shown in FIGS. 3 and 4 is a part of the top plate 48 when the capillary access hole 55' is provided in the top plate 48 of the module 45. Thus, if the access hole 59 for the access plug 60 is made small enough, the plug 60 and plate 47 may be eliminated entirely.

Figure 6:
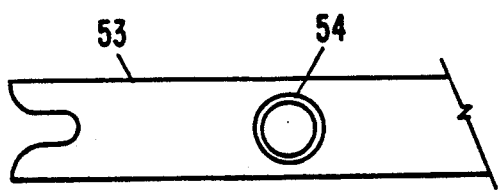
FIG. 6 is a partial plan view of a modified flexible leaf spring employed as a switch contact in the switch shown in FIG. 5.

Refer now to FIG. 6 showing a partial plan view of a modified flexible leaf spring 53 having an aperture at collar 54. The raised collar 54 may be completely removed when the spring 53 which is fitted into slots in either the mandrel 35 or the body plug 52 and is stabilized to prevent horizontal movement.

It is a feature of the present invention to be able to fill the module 45 to a predetermined pressure which compensates for variation in the linear displacement of the flexible diaphragm 46 as well as the sum of all the variable tolerances between the spring contacts 43 and the leads 32 and 33. For example, it is desired to switch the contacts 43 of the novel switch from its normally closed position to an open position when the pressure in the tank 22 falls below a predetermined preselected value. This cannot be done without making some adjustment in the pressure that is employed in the capsule 45. When the novel method of filling the module 45 is employed, it is no longer necessary to provide any other switch adjustment.

In the preferred embodiment method of filling the module 45, the module 23, 40 or 50 is placed in an environment that simulates the desired minimum pressure inside of the tank 22 at the desired switch point to be monitored. First, the operation of the contacts 43 and 53 are checked by engaging and disengaging the contacts with the leads 32 and 33. Once the contacts are engaged against the pins 32 and 33, the module 45 is filled to a point where the contacts first open, then the module is sealed at that pressure regardless of the pressure differential because it is known that at this particular point or pressure, the module is sensing the desired threshold or lower pressure to be monitored in the tank 22.

In the preferred embodiment method of sealing the gas in the module 45, the capillaries 55, 55' or 56 are closed by heating the capillary with a pulsed laser which causes the metal surrounding the capillary to collapse into the capillary and seal the module.

Figure 7:
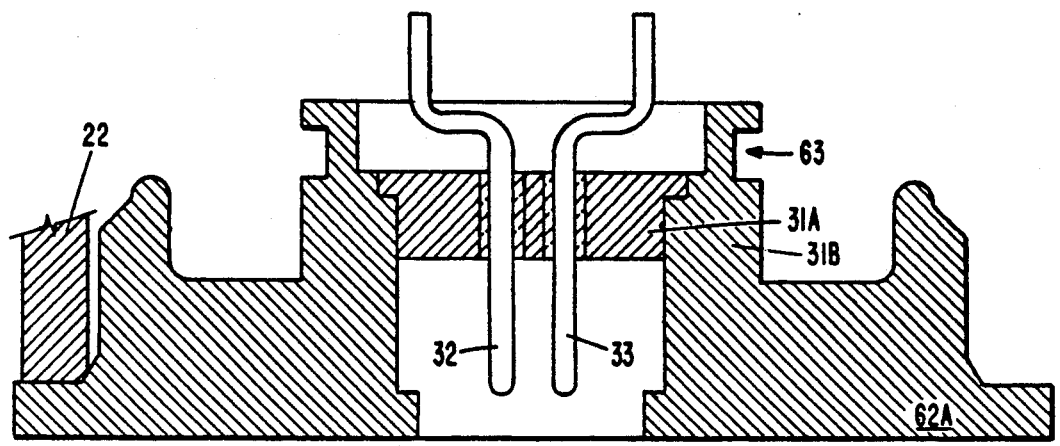
FIG. 7 is a schematic drawing in partial section showing a modified switch body which is integrated into an end closure of the pressure tank shown in FIG. 2.

Refer now to FIG. 7 showing a partial section of a part of a monitor switch 23B having a modified body 31A, 31B. In this embodiment the lower portion of the switch body 31A is shaped to attach to a matching recess in an end closure 62A of the gas tank 22. The groove 63 of the body 31B is adapted to receiver the retainer 49 of the type shown in FIG. 4. The advantage of this modification is that it permits the systems monitor 23 to be manufactured integral with an end closure 62 which is ready to attach to a tank 22 prior to filling the tank.

Figure 8:
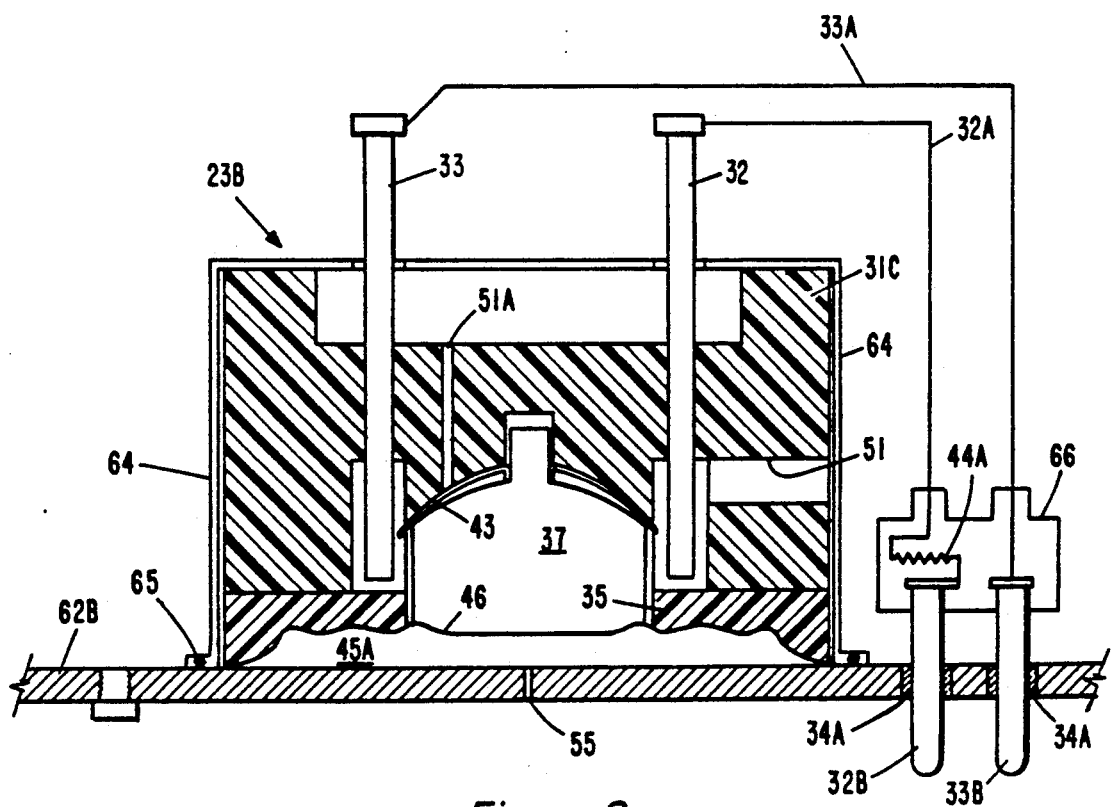
FIG. 8 is a schematic drawing in partial section showing another modified switch body which is integrated into an end closure of the pressure tank.

Refer now to FIG. 8 showing a partial section of a part of another modified monitor switch 23B having a modified body 31C. In this embodiment the flexible bottom plate 46 is attached directly to an end closure 62B to form a capsule 45A. The piston body 37 is shown in its extended position which forces the leaf spring contacts 45 against the switch body 31C and opens the electrical circuit between electrical leads 32 and 33. The body 31C is preferably made from an electrically insulating plastic which eliminates the need for the glass seals 34. The mandrel 35 is shown as a separate piece, but may be made integrally with the body 31C.

Access holes 51 and/or 51A are provided in the body 31C so that gas pressure in tank 22 freely communicates with the outside of flexible diaphragm 46. The advantage of this modification is that monitor 23B is made with fewer parts and the parts are also designed for lower production cost. For example, the body 31C and mandrel 35 can be made as a single injection molded part which is held in place against end closure 62B by a formed retainer or band 64 that is preferably attached to the end closure 62B by welds 65. This modification also eliminates the top plate 47.

An electrical connector 66 is shown having leads 32A and 33A connected to leads 32 and 33, respectively, which interconnects with leads 32B and 33B that extend through end closure 62B. The leads 32B and 33B may be extended through the cylindrical wall of tank 22 instead of end closure 62B. The leads are preferably insulated and sealed at the exit wall by glass to metal seals 34A to provide ease of connection of a snap on connector (not shown). A fault isolation resistor 44A may be provided connected in series and mounted on the internal connector 66. The same resistor may be mounted on the external connector (not shown).

In this embodiment, the monitor may be made very small even though the pressure in capsule 45A and tank 22 are in the range of 3,000 pounds per square inch. This is accomplished by filling tank 22 and capsule 45A simultaneously so that the differential pressure is greatly reduced. A tank plug 65 and capillary hole 55 are provided in the end closure 62B for simultaneously filing testing and sealing the gases inserted in capsule 45A and in tank 22 (not shown) which surrounds module 23B.

Having explained a preferred embodiment of the present invention and a modification of thereof, it will now be appreciated that the novel differential pressure monitoring switch may be made and sealed as a unit before being installed inside of the tank 22. A preferred method of installing the switch 23, 40 or 50 in the tank 22 is to provide a welding ring 61 which may be welded against the end 62 of the tank 22 prior to welding the enclosure 62 to the cylindrical portion of the tank 22.

In the modified embodiment shown in FIG. 8, the monitor switch 23B is made as an integral part of the end closure 62 of tank 22 and is filled subsequent to the mechanical assembly of the inflator 20 shown in FIG. 2.

What is claimed is:

1. A differential pressure monitoring switch, comprising:
   a switch body,
   electrical lead means extending through said switch body to a point outside said switch body,
   a mandrel on said switch body,
   a recess in said mandrel,
   a movable piston mounted in said recess in said mandrel,
   a sealed capsule mounted on said piston and said mandrel,
   said capsule containing gas at a predetermined threshold pressure,
   said sealed capsule comprising a movable diaphragm bottom plate connected to a top plate means,
   contact means coupled to said movable piston for engagement with said electrical lead means when the gas pressure inside said capsule is lower than the pressure on the outside of said diaphragm sufficient to disengage said diaphragm from said mandrel,
   said contact means being disengaged from said electrical lead means when said movable diaphragm is fully engaged with said mandrel means and said threshold pressure in said capsule equals or exceeds the pressure outside of said capsule, and
   retainer means for connecting said top plate means to said switch body.

2. A differential pressure switch as set forth in claim 1 wherein said top plate means of said sealed capsule comprises a thin top plate attached to said movable diaphragm and a fixed rigid cover plate mounted on top of said top plate.

3. A differential pressure switch as set forth in claim 2 wherein said thin top plate is flexible and is sealed to said diaphragm at its outer edges.

4. A differential pressure switch as set forth in claim 1 wherein said top plate means comprises a single fixed cover plate sealed to said diaphragm at its outer edges.

5. A differential pressure switch as set forth in claim 1 wherein said contact means are resilient and comprise a flexible leaf spring mounted on said movable piston for movement therewith and is engagable by a surface of said mandrel for bending the leaf spring to disengage said leaf spring from said electrical lead means.

6. A differential pressure switch as set forth in claim 5 wherein said wherein said resilient contact means comprises a pair of flexible cantilevered springs mounted on said movable piston.

7. A differential pressure switch as set forth in claim 6 which further includes a fault isolation resistor coupled in series between said pair of flexible cantilevered springs.

8. A differential pressure switch as set forth in claim 6 wherein said movable piston comprises a plug housing and a piston plug mounted in a plug recess in said plug housing.

9. A differential pressure switch as set forth in claim 8 which further includes spring recess means in said piston plug for guiding said cantilevered springs therein.

10. A differential pressure switch as set forth in claim 9 wherein said cantilevered springs are provided with formed mounting arms shaped to fit in said spring recess means of said piston plug whereby said cantilever springs are mounted on said piston when said piston plug is mounted in said plug housing.

11. A differential pressure switch as set forth in claim 1 wherein said fixed top plate means is provided with a capillary filler hole which is closed after filling said sealed capsule to a differential pressure where said resilient contact means first disengages the electrical means.

12. A differential pressure switch as set forth in claim 11 wherein said sealed capsule is sealed at a simulated pressure on the outside of said movable diaphragm that is at the threshold pressure to be sensed by said monitoring switch.

13. An assembly including a differential pressure switch for a hybrid air bag inflator, comprising:
   an elongated cylindrical tank for receiving an expandable type gas at a first pressure P1, a first sealed end on said tank having an igniter-gas generator mounted thereon for heating and expanding said expandable type gas for use in inflating an air bag, a second sealed end on said tank having said differential pressure switch mounted thereon inside of said tank for monitoring said first pressure P1 in said tank, said pressure switch having a switch body attached to said second sealed end, electrical lead means extending through said switch body and through a wall of said tank to a point outside of said tank, a mandrel on said switch body, a movable piston extending through a recess in said mandrel, contact switch means coupled to said piston for opening or closing an electrical path between said electrical lead means, a sealed capsule mounted juxtaposed said piston and said mandrel for actuating said contact switch means, and said capsule containing a gas at a threshold pressure P2 where P1 is greater than P2 when the gas pressure P1 in said tank is sufficient to fill an air bag.

14. An assembly including a differential pressure switch as set forth in claim 13 wherein said second sealed capsule comprises a flexible diaphragm attached to a fixed plate means.

15. An assembly including a differential pressure switch as set forth in claim 14 wherein said second sealed end of said tank also comprises said fixed plate means.

16. An assembly including a differential pressure switch as set forth in claim 15, which further includes formed retainer means for attaching said switch body to said second sealed end.

* * * * *